US009256481B2

(12) United States Patent
Allen et al.

(10) Patent No.: US 9,256,481 B2
(45) Date of Patent: *Feb. 9, 2016

(54) DYNAMIC USER INTERFACE AGGREGATION THROUGH SMART EVENTING WITH NON-INSTANTIATED CONTENT

(71) Applicant: International Business Machines Corporation, Armonk, NY (US)

(72) Inventors: Joshua S. Allen, Durham, NC (US); Paul L. H. Carroll, Lakeway, TX (US); Samar Choudhary, Morrisville, NC (US); Richard A. King, Cary, NC (US); Vijay Pandiarajan, Apex, NC (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,821

(22) Filed: Apr. 17, 2013

(65) Prior Publication Data

US 2013/0232509 A1 Sep. 5, 2013

Related U.S. Application Data

(63) Continuation of application No. 13/412,266, filed on Mar. 5, 2012.

(51) Int. Cl.
*G06F 9/46* (2006.01)
*G06F 9/54* (2006.01)

(52) U.S. Cl.
CPC .......... *G06F 9/542* (2013.01); *G06F 2209/543* (2013.01); *G06F 2209/545* (2013.01)

(58) Field of Classification Search
None
See application file for complete search history.

(56) References Cited

U.S. PATENT DOCUMENTS

| 5,999,948 | A | 12/1999 | Nelson et al. |
|---|---|---|---|
| 7,757,210 | B1 | 7/2010 | Krueger |
| 2003/0055878 | A1* | 3/2003 | Fletcher et al. ............... 709/203 |

(Continued)

FOREIGN PATENT DOCUMENTS

| EP | 1190304 | 3/2002 |
|---|---|---|
| WO | WO0067114 | 11/2000 |

OTHER PUBLICATIONS

International Search Report mailed Jul. 16, 2013 in corresponding International Application No. PCT/CA2013/050162.

*Primary Examiner* — Shih-Wei Kraft
(74) *Attorney, Agent, or Firm* — Scully, Scott, Murphy & Presser, P.C.

(57) ABSTRACT

A published event from a first content element executing within a framework may be detected. In response, a registry may be searched for one or more registered events that match the published event, and if a matching registered event is found, a second content element that registered said matching registered event may be instantiated to start executing within the framework. The second content element is dynamically aggregated into the framework based on the published event without the first content element needing to have previous knowledge of the second content element, and without the second content element needing to have previous knowledge of the first content element. The framework also does not need to be designed initially to deploy the second content element. Which one or more content elements to aggregate into the framework may be determined at run time rather than at design time.

7 Claims, 5 Drawing Sheets

(56) References Cited

U.S. PATENT DOCUMENTS

| | | |
|---|---|---|
| 2004/0090969 A1* | 5/2004 | Jerrard-Dunne et al. 370/395.54 |
| 2006/0031849 A1* | 2/2006 | Barta et al. ............... 719/320 |
| 2006/0230062 A1* | 10/2006 | Roy-Chowdhury et al. . 707/103 X |
| 2007/0005731 A1* | 1/2007 | Lection et al. ............ 709/219 |
| 2007/0050756 A1 | 3/2007 | Paller |
| 2008/0104611 A1* | 5/2008 | Kussmaul ................. 719/311 |
| 2008/0244575 A1 | 10/2008 | Carter et al. |
| 2009/0006610 A1* | 1/2009 | Venable ................... 709/224 |
| 2009/0094339 A1 | 4/2009 | Allen et al. |
| 2009/0313601 A1 | 12/2009 | Baird et al. |
| 2010/0042709 A1* | 2/2010 | Liesche et al. ............ 709/222 |
| 2011/0131501 A1 | 6/2011 | Lauridsen et al. |
| 2011/0320458 A1 | 12/2011 | Karana |

* cited by examiner

DYNAMIC USER INTERFACE AGGREGATION THROUGH SMART EVENTING WITH NON-INSTANTIATED CONTENT

RELATED APPLICATION

This application is a continuation of U.S. Ser. No. 13/412,266, filed Mar. 5, 2012, the entire content and disclosure of which is incorporated herein by reference.

FIELD

The present application relates generally to computer systems and computer applications, and more particularly to operating systems, web application, portals and eventing frameworks.

BACKGROUND

Web applications can be composed of independent content such as portals which provide access points to information in the World Wide Web (web) or the like global network, mashups which are web pages or applications that have combined elements such as functionality and data from multiple sources to create new services. These web applications traditionally have statically defined page contents or can explicitly add dynamic content to a page. That is, the pages are predefined and content on each page could explicitly add a specific new portlet or widget in response to various actions. Briefly, a portlet is a pluggable user interface software component that is managed and displayed in a web portal. A widget is a small application that can be installed and executed within a web page. In an environment composed of independently developed content, standardized eventing frameworks can be used to pass data between portlets or widgets on the same page. Operating systems essentially behave the same way; users can explicitly load applications, and applications can explicitly load other applications in response to various actions. This is analogous to loading portlets on a portal page and having those portlets launch additional portlets. Operating systems generally behave like single-page portals.

In the Web Application or Operating System field of technology, there currently exists no ability to dynamically load content or applications, and pass data based on events, unless the new content or application is previously known and explicitly coded into the originating content or application.

For example, current Web applications either explicitly launch specific content by hard-coding the desired new contents, in which flexibility or mashup capabilities may be reduced, or construct pages with all content already present to enable eventing between the separate content, complicating layout and usability issues. Similarly, operating system applications either explicitly launch specific applications by hard-coding the new application, or have all relevant applications already loaded and listening for events, perhaps as just a widget or plugin that launches the full application, but nevertheless running constantly in the background.

BRIEF SUMMARY

A method and system for dynamically aggregating content through smart eventing with non-instantiated content may be provided. The method, in one aspect, may include executing on a processor a first content element within a framework. The method may also include, in response to detecting a published event from the first content element executing within the framework, searching a registry for one or more registered events that match the published event, and if a matching registered event is found, instantiating a second content element that registered the matching registered event to start executing within the framework. The second content element may be dynamically aggregated into the framework based on the published event without the first content element needing to have previous knowledge of the second content element, and without the second content element needing to have previous knowledge of the first content element. The framework also need not be designed initially to deploy the second content element.

A system for dynamically aggregating content through smart eventing with non-instantiated content, in one aspect, may include a framework environment operable to execute on the processor. A first content element may be operable to execute within the framework environment. A registry may include one or more registered events and associated one or more second content elements that dynamically registered said one or more registered events. The framework, in response to detecting a published event from the first content element at runtime, may be further operable to search the registry for a registered event that match the published event, and if a matching registered event is found, instantiate a second content element that registered the matching registered event to start executing within the framework. The second content element may be dynamically aggregated into the framework based on the published event without the first content element needing to have previous knowledge of the second content element, and without the second content element needing to have previous knowledge of the first content element. The framework also need not be designed initially to deploy the second content element.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
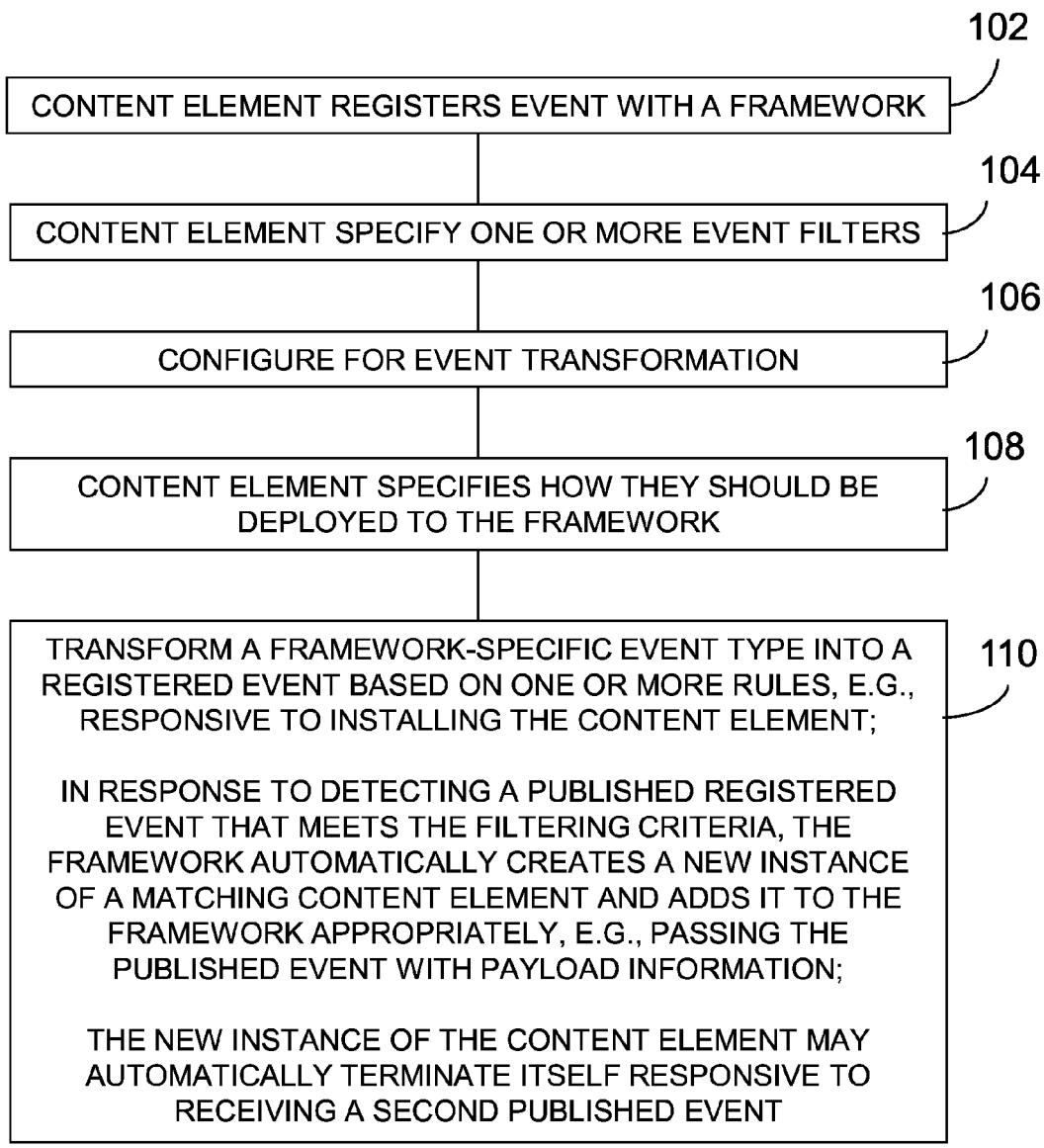
FIG. 1 illustrates a method of the present disclosure in one embodiment.

The present disclosure generally discloses methodologies and systems for dynamically adding application components into an application framework based on events. The application components may be dynamically added by having the application components register with the application framework by specifying a filtering criteria corresponding to events. Subsequently, when an event occurs in the application framework, the application framework automatically invokes or adds the application components whose filtering criteria match that of the event, for instance, in a logical manner with respect to the event. Additionally event related data may be transformed into a form acceptable by the application components which are invoked or added into the application framework.

Particularly, the present disclosure in one embodiment enables aggregation and eventing across frameworks, for example, operating system frameworks, web and other application frameworks, and others. In the present disclosure, in one embodiment, dynamic application frameworks may be constructed based on building blocks from independent suppliers or sources or the like, where the content and layout are dynamically determined based on events rather than prior knowledge. In one embodiment of the present disclosure, a registry mechanism may be provided to register the available content linked to relevant events that would trigger adding the content to the framework. Further, a mechanism may be provided to dynamically invoke or add content when triggered by events, without pre-knowledge by the content generating the event. A mechanism may be also provided to add dynamic content in a logical manner with respect to position, size, and/or other criteria, based on the event context. Still yet, a mechanism may be provided for standardized eventing structure or transformation capability.

In one aspect, an application framework of the present disclosure may build dynamic user interfaces (UIs) based on eventing rather than predetermined layouts and actions. Existing or already running content elements send events based on their own content. The framework running that content element then builds a dynamic UI composed of other content from any number of content providers that can process each event. The construction is dynamic in that other content is not necessarily running or present in the UI; rather, they are newly deployed based on the event. In addition, the existing content need not have prior knowledge of or know about the new content. The new content also need not have prior knowledge of or know about the content that generates the event. The framework and/or the dynamic content may ensure that the new content is added in a logical manner with respect to the triggering event, e.g., size, position, and other criteria. In this way a dynamic UI can be built automatically from participating content providers, including generation of layouts that were not previously defined or planned for at development time. As dynamically added content elements can also take automated actions on launch, this framework also may allow automated actions to be dynamically assembled.

The methodology of the present disclosure may be implemented for instance, as a feature of a portal or mashup framework such as the Tivoli® Integrated Portal (TIP) from International Business Machines Corporation (IBM®), Armonk, N.Y., but is not restricted to this environment. It is also applicable to operating system frameworks or any other framework with independently sourced content and eventing.

FIG. 1 illustrates a method of the present disclosure in one embodiment. At 102, a framework such as an operating system, an application or a web application in one embodiment may enable a content element to be added to the framework, for instance, by registering with the framework, specifying the identity of the content element and one or more events that the content element can respond to, even when the content element is not already running. For instance, a content element may register by inserting an entry in registry (e.g., a database table, a file or the like) which the framework maintains. The entry may include the identity (e.g., name) of the content element and one or more events. For a web application, examples of content element may include but are not limited to portlets and iwidgets. The content elements are considered to be "not running" if they are not present on the web page of the web portal. As another example, for an operating system, content elements may include, but are not limited to, applications. The applications are considered "not running" if that application is not loaded in memory or not executing on a processor. The registry may be open for registering at anytime, e.g., even during the runtime of the framework and other content elements deployed within the framework.

At 104, content elements also may specify event filters that control when they will respond to specified events. For instance, filters may be implemented as simple rules parsed by the framework or application programming interface (API) or executable commands.

At 106, content elements can also be configured for event transformation when the original event is not in a 'standard' form. The configuration of transformations can be done at "install" or "deploy" time when events are known, rather than at development time of the publishing or receiving content. In the present disclosure, the terms "install" and "deploy" are generally used synonymously and interchangeable, for instance, to refer to installing of standalone applications and the like, deploying of modules or plugins or the like. The transform aspect of the present disclosure in one embodiment allows for the feature the capability of the present disclosure need not be designed into the original code of the content element. The content element does not need to know explicitly when events will happen or where they originated. For example, when installing a portlet that responds to a 'TrafficAlert' event, a transform might be specified to turn any 'CollisionEvent' or 'WeatherEvent' events from the framework into 'TrafficAlert' events. The portlet does not have to be written or coded to know anything about these framework-specific event types because transformation functionality of the present disclosure in one embodiment is available to handle. Transformation may be implemented as one or more rules, for instance, parsed by the framework or API or executable commands.

At 108, content elements also may specify how they should be deployed to the framework. For example, for a web application, portlets or iWidgets or other content element may specify where on the originating page (e.g., web portal) they should be added, either absolutely or relative to coordinates in the event passed. For instance, consider a widget in a portal environment that represents a street map. An event from this widget may include 'CollisionEvent' that is triggered by data feeding the map widget. The event can include x-y coordinates as attributes so that the collision is linked with an actual location on the displayed map. When this occurs, the framework may instantiate a new content element that was registered, for example, adding a widget that provides 'dispatch emergency crews to this site' capabilities. The new widget is added to the page with x-y position relative to the event coordinates included in the 'CollisionEvent' for maximum usability. Another example may be on a stock price chart, being updated over time. When an event such as a rapid change in stock price occurs, a 'buy/sell now' widget may be added in a position such that it explicitly refers to the part of the chart that triggered it. For an operating system, for example, applications may specify that they should be loaded in the background or launched with parameters from the event.

At 110, when an existing content element publishes a registered event that meets the filtering criteria, the framework automatically creates a new instance of a matching content element and deploys it to the framework appropriately. In one embodiment of the present disclosure, if there are multiple matches, all may be added to the framework. For example, if more than one content element matches the published events, all the matching content elements may be instantiated on the framework and executed.

Figure 2:
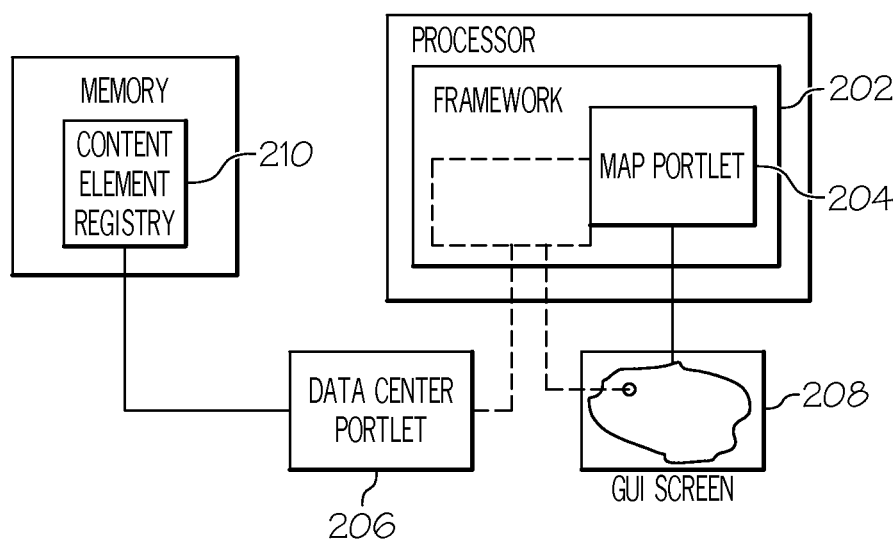
FIG. 2 illustrates an example scenario implementing the methodology of the present disclosure in one embodiment.

An example scenario implementing the methodology of the present disclosure in one embodiment is described below with reference for FIG. 2. This example illustrates data center management application from generic map portlet. A purely generic map portlet developed by Product A displays a map and places indicators on it from a configurable data source. The data source also provides event data to be published in 'MapEvents' each time data changes. A data center portlet developed by Product B is available which registers to be launched whenever an event associated with MapEvent occurs, for instance, with filter such as with data indicating 'type=ABCDataCenter' and 'status=red'.

A framework 202, for instance, an application UI is built with a single map portlet 204 for instance on a UI page or screen 208, effectively forming the background, using a data source providing data about all of ABC Corporation's data centers. The framework 202 and the map portlet 204 runs on a processor. The data feeding the map portlet triggers a MapEvent with 'type=ABCDataCenter' and 'status=red'. In response, the framework 202 may check the registry of content elements 210, for instance, stored in memory and identify that the triggered event matches an event registered by a content element, in this example, the data center portlet.

The framework 202, the application UI in this example, creates an instance of the data center portlet 206 and adds it to the page 208 on top of the map, positioned so that it directly 'points' to the event coordinates, which unknown to the generic map portlet 204, represents a data center. The data center portlet 206 now is dynamically added and may execute on the processor (run). The framework 202 passes the MapEvent to the new instance or newly launched data center portlet 206 notifying the user of the problem and allowing remediation. The new instance of data center portlet 206 may receive a payload of the map event or transformed form of the event after being added on the UI page. A company that has multiple data centers (where servers provide services) can use a generic map portlet or widget and eventing to show status of its data centers to an operator. For example, if the cooling system fails at one site, it could trigger a MapEvent with payload specifying data center location (x,y coordinates), severity of the issue, and other information. The interface can then add an appropriate (registered) widget to the interface so that the operator can be aware of the event or actually take actions based on the event. In the cooling system failure example, the framework might instantiate a 'maintenance ticketing' widget that allows the operator to create a request for work, assign it priority, and/or perform other actions.

Upon notification, the user or another may address the identified alert at the data center and make corrections. The remediation causes a change in the data source, triggering a new MapEvent with 'type=IBMDataCenter' and 'status=green'. The data center portlet 206 (now existing on the UI page) can respond to the 'green' status event by closing itself automatically or providing feedback or further actions.

In the above example, dynamically added content is added or invoked in response to events, but does not have to be already loaded and listening for events. The originating portlet (e.g., map portlet) is completely generic, it requires no knowledge that it is being used to monitor data centers or that a data center portlet is available to handle events. The same map portlet may monitor a feed of street traffic congestion data, football scores, or election results, or even multiple types of feeds at the same time, and send the same type of generic MapEvents. Thus, the map widget may be truly generic and need not be coded specifically toward or with respect to the types of content elements that might respond. The map widget may publish any type of payload in the events; the registration and filtering functionalities of the present disclosure may control what type of interface results. The framework builds a specialized application UI dynamically by knowing what content can be added for different events and payloads.

Figure 3:
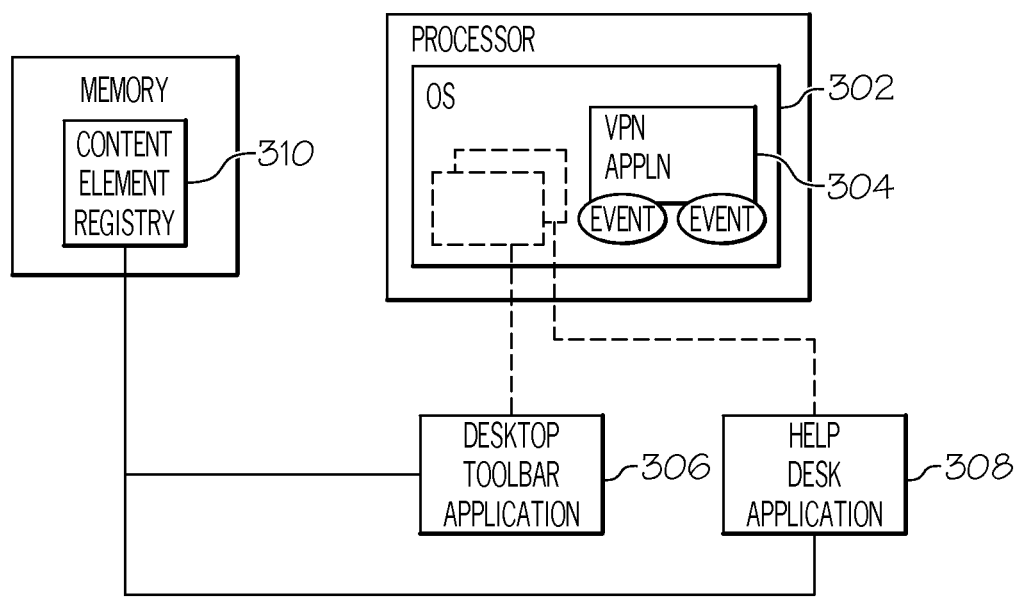
FIG. 3 illustrates another example scenario implementing the methodology of the present disclosure in one embodiment.

Another example scenario implementing the methodology of the present disclosure in one embodiment is described below with reference for FIG. 3. This example illustrates operating system framework that can dynamically add applications or components based on eventing. A generic virtual private network (VPN) application developed by Company A is sold to many companies. It publishes VpnEvents when a VPN connection is established, closed, and unexpectedly terminated. Publishing an event may include calling a framework's API to specify that an event is being published. The framework may implement an eventing API to receive or catch the events and handle them. Company B buys the generic VPN application for use by its employees. Company B also provides a specialized desktop toolbar application that should be running any time the user is connected to the VPN, and a specialized help desk application that should be automatically run any time the VPN connection is unexpectedly terminated. The operating system 302 runs a VPN application 304 on a processor. The desktop toolbar application 306 registers to receive VpnEvents with 'type=connected'. The help desk application 308 registers to receive VpnEvents with 'type=terminated'. As the VPN application 304 publishes events, the operating system 302 automatically launches the registered applications, for instance, rather than requiring them to be running in the background all the time to get the event. For instance, the operating system 302 may check the registry of content elements 310, and match a generated event with those in the registry 310. In response to finding a match, the operating system 302 launches the content element associated with that event in the registry 310.

While the above examples illustrate the methodologies of the present disclosure with respect to operating system and application environments and web application and portlet environments, it should be understood that the system of registering, filtering, launching may also apply to different environment.

Figure 4:
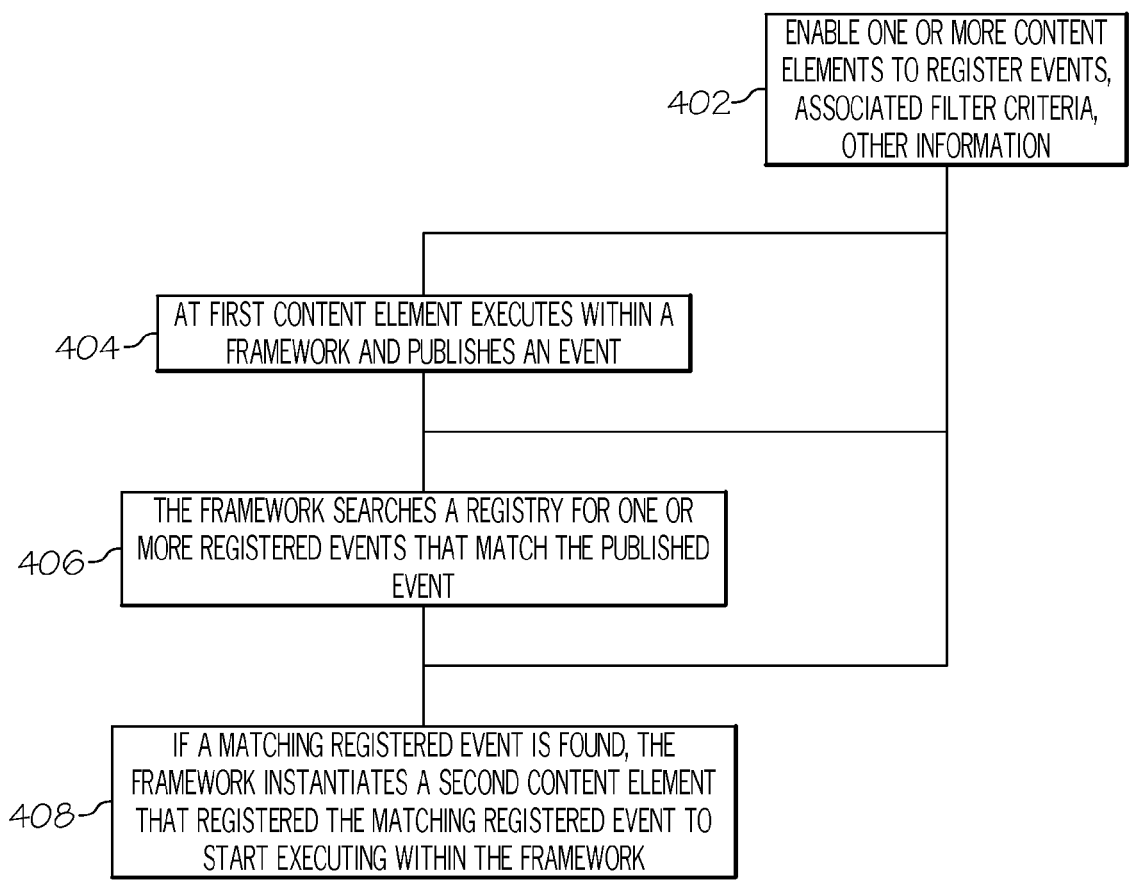
FIG. 4 is a flow diagram illustrating a methodology of dynamically aggregating content in one embodiment of the present disclosure.

FIG. 4 is a flow diagram illustrating a methodology of dynamically aggregating content in one embodiment of the present disclosure. At 402, one or more content elements may be registered with a framework, for example, specifying one or more events that the one or more content elements can respond to and handle. The one or more events may be specified with filter criteria, indicating the condition of the event to which the one or more content elements respond. The registering may be performed at any time, dynamically, for example, even as the framework and other one or more content elements are running. The registered content elements may be independent components from the framework or other one or more content elements that can be run within the framework.

At 404, a content element (e.g., referred to as a first content element) executes within a framework. This first content element need not be aware of or need not have previous knowledge of the registered one or more content elements. The first content element during the course of its execution may publish one or more events.

At 406, in response to detecting a published event from the first content element executing within the framework, the framework may search a registry for one or more registered events that match the published event. At 408, if a matching registered event is found, the framework may instantiate a second content element that registered the matching registered event to start executing within the framework. The published event and payload may be passed to the second content element, so that for example, the second content element may perform its given function within the framework. The registry may also include information about how the second content element should be launched in the framework, for example, physical location of a UI if the framework is a UI, presentation criteria, and others. Furthermore before, passing the published event and any other information, the published event and any other information may be transformed into different form or format understandable by the second content element, e.g., from the form published by the first content element. The second content element thus is dynamically aggregated into the framework based on the published event without the first content element needing to have previous knowledge of the second content element. In addition, the second content element need not have previous knowledge of the first content element. The framework also does not need to be designed initially to deploy the second content element. The second content element also may automatically terminate itself upon detecting of another published event.

Figure 5:
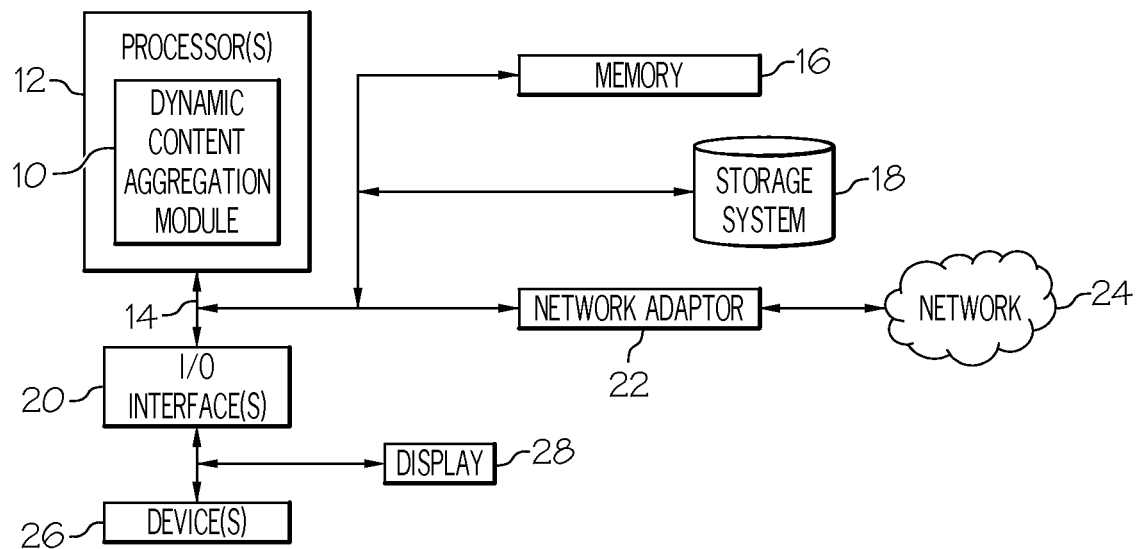
FIG. 5 illustrates a schematic of an example computer or processing system that may implement the dynamic content aggregation of the present disclosure in one embodiment.

FIG. 5 illustrates a schematic of an example computer or processing system that may implement the dynamic content aggregation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12.

The processor 12 may include a dynamic content aggregation module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for dynamically aggregating content through smart eventing with non-instantiated content, comprising:

executing on a processor a first content element within a framework; and in response to detecting a published event from the first content element executing within the framework, searching a registry for one or more registered events that match the published event, and if a matching registered event is found, instantiating a second content element that registered said matching registered event to start executing within the framework, content layout of the second content element determined dynamically based on the published event, without the framework having prior knowledge of the content layout of the second content element, wherein the second content element is dynamically aggregated into the framework based on the published event, wherein the method further comprises transforming one or more framework-specific event types into the one or more registered events at least based on one or more rules, the transforming performed responsive to installing the second content element, wherein the instantiating further includes passing the published event with payload information comprising at least how the second content element is installed into the framework, to the second content element that is instantiated, wherein the instantiated second content element automatically terminates itself in response to receiving a second published event, wherein the published event is transformed before being passed to the instantiated second content element.

2. The method of claim 1, further including enabling one or more content elements to register dynamically with the framework by specifying one or more events to which said one or more content elements respond.

3. The method of claim 2, wherein said one or more content elements further specify filter criteria for responding to said one or more events.

4. The method of claim 1, wherein the framework determines at run time rather than at design time of the framework, which one or more content elements to aggregate into the framework.

5. The method of claim 1, wherein the framework includes an operating system, web application, or user interface application, or combinations thereof.

6. The method of claim 1, wherein the first content element includes a widget, a portlet, an application, or combinations thereof.

7. The method of claim 1, wherein the second content element includes a widget, a portlet, an application, or combinations thereof.

* * * * *